July 28, 1959      C. R. JOHNSTON      2,896,554
FREIGHT POSITIONING AND RETAINING APPARATUSES Original Filed Aug. 17, 1956      2 Sheets-Sheet 1

INVENTOR.
CHARLES RICHARD JOHNSTON
BY
HIS ATTORNEYS.

July 28, 1959  C. R. JOHNSTON  2,896,554
FREIGHT POSITIONING AND RETAINING APPARATUSES
Original Filed Aug. 17, 1956  2 Sheets-Sheet 2
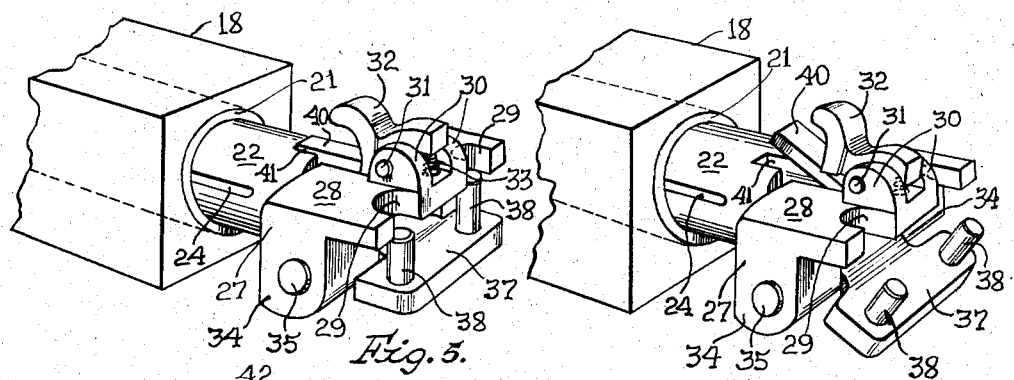
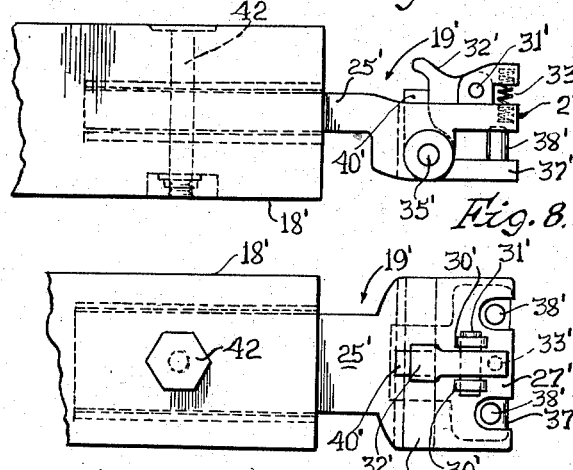
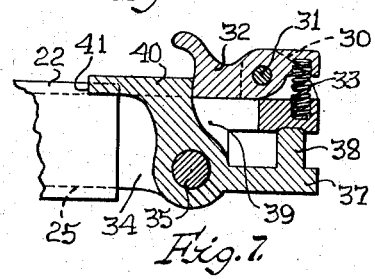
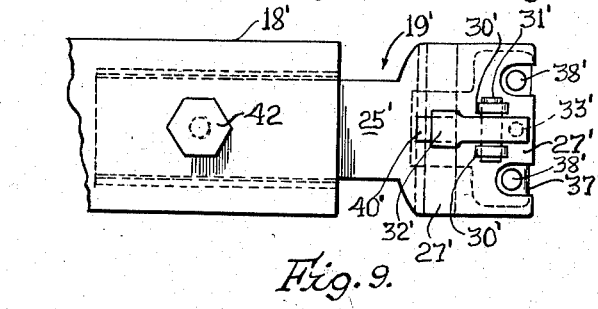
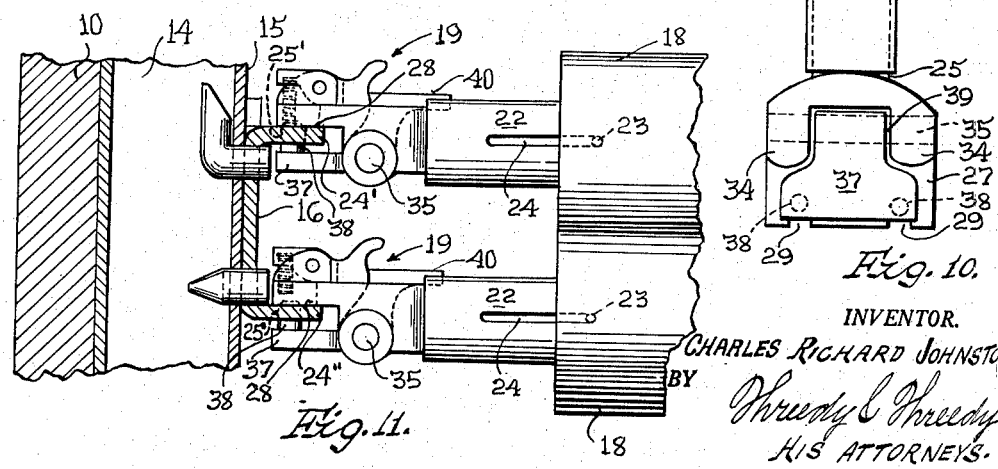
INVENTOR.
CHARLES RICHARD JOHNSTON
BY
Threedy & Threedy
HIS ATTORNEYS.

United States Patent Office 2,896,554
Patented July 28, 1959

2,896,554

FREIGHT POSITIONING AND RETAINING APPARATUSES

Charles Richard Johnston, Chicago, Ill., assignor to Transportation Specialties Co., Chicago, Ill., a corporation of Illinois Original application August 17, 1956, Serial No. 604,674. Divided and this application March 18, 1957, Serial No. 646,666

4 Claims. (Cl. 105—369)

My invention relates to new and useful improvements in freight positioning and retaining apparatuses and has for its principal object the provision in an apparatus of this character of a method whereby a standard freight hauling vehicle may be readily and economically converted into a vehicle which will receive and retain freight of assorted shapes and sizes.

Another object of my invention is the provision in an apparatus of this character of a means for equipping the interior of a freight hauling vehicle with a removable freight positioning and retaining member.

Yet another and equally important object of my invention is in the provision in an apparatus of this character of an improved freight retaining bar which may be easily positioned and adjusted within said freight hauling vehicle.

Yet another and equally important object of my invention is in the provision of an apparatus of this character whereby the freight retaining bars are constructed so as to have a self-locking head for engagement and cooperation with supporting members removably positioned on the interior walls of the freight hauling vehicle.

A further object of my invention is to provide freight retaining bars that are equipped with a self-locking head which is telescopical with respect to the body of the bar.

A further object of my invention is in the provision of an apparatus of this character whereby the freight retaining bars are equipped with self-locking head portions that are rotatably carried by the freight retaining bar.

Still another object of my invention is in the provision of an apparatus of this character whereby the self-locking heads of the freight retaining bars when in latched freight retaining position are locked against rotation with respect to said bar.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 5 is a fragmentary perspective view of my improved self-locking head in closed position;

Fig. 6 is a fragmentary perspective view similar to Fig. 5, but showing the self-locking head in open position;

Fig. 7 is a fragmentary detail sectional view taken on line 7—7 of Fig. 4;

Fig. 8 is a fragmentary side view of my modified form of a flat type self-locking head and retaining bar;

Fig. 9 is a fragmentary bottom view of the modified form shown in Fig. 8;

Fig. 10 is a fragmentary sectional bottom view of the retaining bar and locking head taken on line 10—10, Fig. 3;

Fig. 11 is a fragmentary side elevational view of a modified form for removably attaching my supporting means to the interior of a freight hauling vehicle.

This present application is a division of applicant's co-pending application, Serial No. 604,674, filed August 17, 1956, now Patent No. 2,806,436 dated September 17, 1957.

The hauling of freight of assorted shapes and sizes has established the need for a shipper to simply and conveniently convert the interior of a standard freight hauling vehicle into a specialized design which will accommodate the various sizes and load capacities of the assorted freight to be shipped. The means and method to so convert the interior of the vehicle is the subject matter of this invention.

Figure 1:
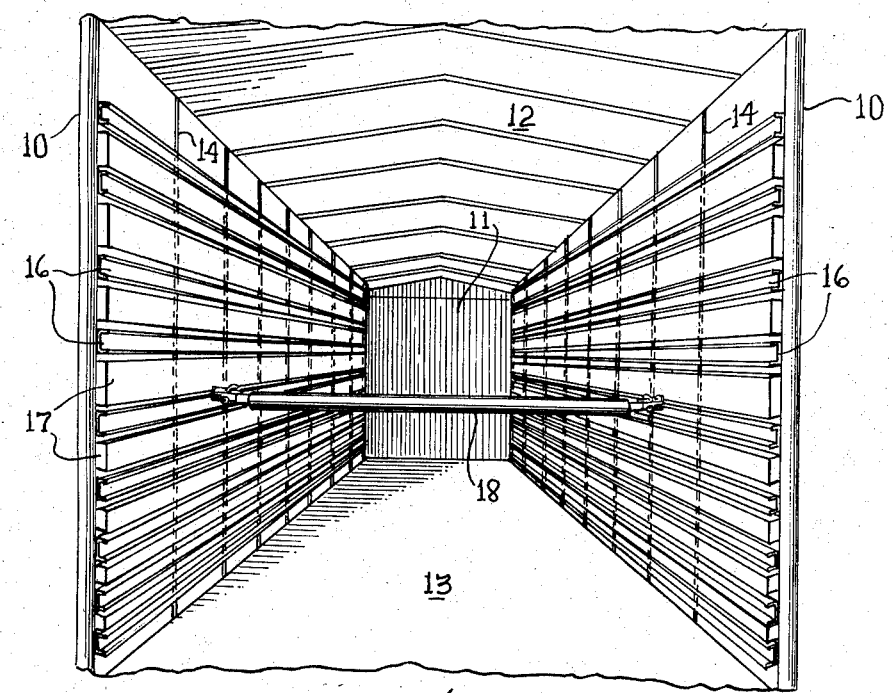
Fig. 1 is a fragmentary perspective view of the interior of a freight hauling vehicle showing my present invention and operative position thereof.

Referring to Fig. 1, there is shown a fragmentary perspective view of the interior of a freight hauling vehicle having side walls 10, and end wall 11, a roof 12, and floor 13. The side walls 10 are provided with vertical spaced apart Z-shaped structural ribs 14. Removably attached to a plate 15 carried on the inner face of these ribs 14 are sectional longitudinal supporting members 16. These removable supporting members 16 are vertically spaced apart throughout the height of side walls 10, as shown in Fig. 1. Between these removable supporting members 16 are wood filler blocks 17 of such thickness as to present a flush interior wall to the vehicle. This arrangement and construction is well known in the trade and constitutes no part of my present invention.

Adapted to be removably latched to any of the supporting members 16 is a freight positioning and retaining bar 18. Each free end of such bar 18 is provided with a head 19 which carries a jaw locking structure 20, hereinafter described.

Referring to Figs. 2 through 9, there is disclosed a retaining bar 18 having heads 19 providing jaw locking structures 20. It is these bars 18 that cooperate with the supporting members 16 for positioning and retaining the assorted sizes of freight within the vehicle.

Figure 2:
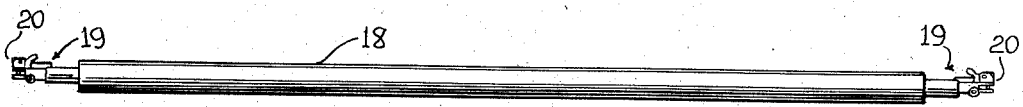
Fig. 2 is a perspective view of my improved freight retaining bar.

As shown in Fig. 2, the retaining bar 18 is equipped with a head 19 at either end thereof. Each of these heads is of like construction; therefore, I shall describe but one. The head 19, as shown in Figs. 3 to 6, is telescopic as well as rotatable with respect to the bar 18. It should be noted that each of the heads 19 may be rotatable, but that it is preferable that only one be telescopic with respect to the bar 18. The bar 18 at either end is hollowed out to form a recess for the head 19. The bar 18 may be either round or rectangular in cross section and such difference in form will have no effect upon the construction to be hereinafter described. Fitted securely into the recess just previously referred to, is a sleeve 21. Slidable in the sleeve 21 is a casing 22. Extending inwardly of the sleeve 21 is a stop pin 23, the free end of which rides in a slot 24 formed in the periphery of the casing 22. As such, the casing 22 may move in or out of the sleeve 21 a distance equal to the length of the slot 24. Any additional movement is restricted by the pin 23.

Rotatably carried in the casing 22 is a jaw carrying rod 25. The free end of the rod 25 extends beyond the inner end of the casing 22 as shown in dotted lines in Figs. 3 and 4. At this free end of the rod 25 there is an exposed stop pin 26. This pin 26 prevents telescopic movement of the rod 25 relative to the casing 22 but permits the rod 25 to be rotated through the longitudinal length of the casing 22.

The opposite end of the rod 25 is provided with an integral enlarged upper jaw-like structure 27. This structure 27 provides a lateral flat portion 28 extending parallel to the longitudinal axis of the bar 18. The free end of the plate 28 has two spaced apart notched-out portions 29. Intermediate the notches 29 are spaced apart vertically extending ears 30. Journalled between these ears 30 on a suitable shaft 31 is a latch finger 32. The flat plate 28 between the ears 30 provides a hollowed-out recess forming a seat for a spring 33. The outer end of the spring 33 bears against a portion of the latch finger 32, urging the same in a counter-clockwise direction as viewed in Figs. 3, 5, 6 and 7, for purposes hereinafter described.

Figure 3:
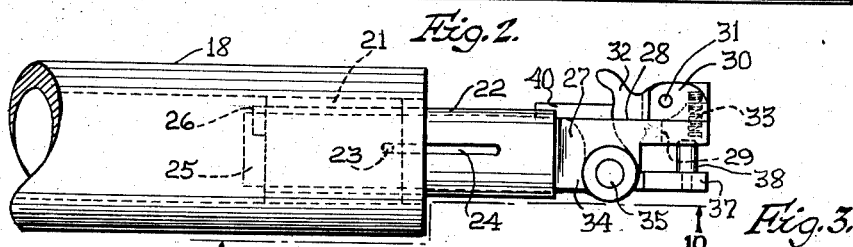
Fig. 3 is a fragmentary side view of the retaining bar and its improved self-locking head.
Figure 4:
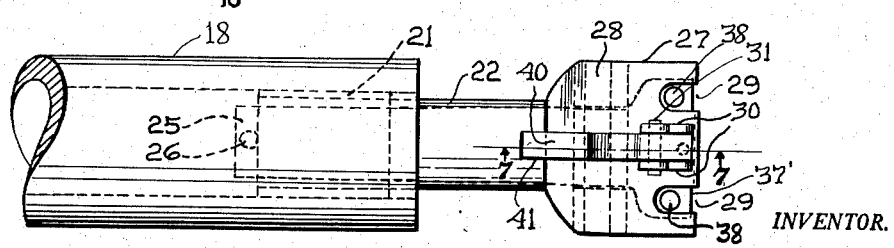
Fig. 4 is a fragmentary bottom view of the subject matter disclosed in Fig. 3.

The plate 28 provides spaced apart depending bosses 34. Between these bosses 34 and rotatably carried by a stud pin 35 is a bearing structure 36 (Figs. 7 and 11) of the lower jaw member 37. The lower jaw member 37 provides vertically extending spaced apart latch teeth 38. The free ends of the teeth 38 are in vertical alignment with and are receivable in the notched-out portions 29 of the plate 28 of the upper jaw structure 27 (as shown in Figs. 3 and 4).

Extending generally upwardly and rearwardly with respect to the member 37 and teeth 38 between the bosses 34 and through an opening 39 formed in the structure 27, is a positioning arm 40 (Fig. 7). This arm 40 has a free end receivable in a recess 41 formed in the end of the casing 22 (Figs. 3 to 7). The lower jaw structure is rotatable about the pin 35 in a clockwise direction, as shown in Figs. 5 and 6. When the structure 36 together with its cooperating elements is in a substantially horizontal position, the free end of the arm 40 is disposed in the recess 41 and will thereby prevent rotation of the head 19 and rod 25 through the longitudinal axis of the casing 22. In such position as shown in Fig. 5, the latch finger 32 is in abutting relation with the free end of the arm 40 and prevents clockwise rotation thereof.

When the latch finger 32 is raised and pivoted against the action of the spring 33, the lower jaw member 37 and its cooperating elements will by gravity pivot about the pin 35 in a clockwise direction as shown in Fig. 6. Such rotation of the lower jaw structure 37 could be accomplished by spring action or through gravity as hereinbefore explained.

In Figs. 8 and 9 I have illustrated a form of retaining bar which has a non-telescopic, non-rotatable head. The head has an upper jaw structure 27' and a lower jaw structure 37' similar in construction to the form shown in Figs. 3 to 6. However, in the illustration as depicted in Figs. 8 and 9, the rod 25' is of a flat design and is attached in a recess formed in the bar, by means of a nut and bolt arrangement 42, both the nut and bolt being countersunk in the sides of the bar to prevent entanglement with freight stored adjacent thereto.

In operation, the freight handler may removably attach a supporting member 16 to each of the ribs 14 throughout the interior of the vehicle, or he may attach the supporting member 16 at such locations as is deemed necessary. The freight is packed or placed within the vehicle and the retainer bar 18 is latched in place. The lower jaw 37 is opened by the operator in the manner hereinbefore described, and the head may be rotated or telescopically adjusted as the need may be and the flat portion 28 may be placed on either of the arms 24' or 24" of the member 16. In such position, the bar 18 may be moved along the length of the member 16. The flat portion 28 thus presents a full flush bearing surface for engagement with the member 16, which bearing surface is the full width of the head 19 and by reason of such size prevents rotation of the head 19 as it is slid along member 16. When the retaining bar 18 occupies the desired position, usually in close proximity to the packed freight, the lower jaw structure 37 is rotated in an anticlockwise direction so as to project the teeth 38 thereof through the aperture 25' of the member 16 and into closed position with respect to the notched-out portions 29 of the upper jaw section 27, as shown in Fig. 11.

If the packed freight is of sufficient size and weight, it may be desirable to employ two retaining bars and, if so, the second of the bars may be attached to the arm 24", as shown in Fig. 11.

It should be noted that as shown in Figs. 3 to 6, the heads 19 are telescopically arranged with respect to the bar 18 and are only limited in such telescopic movement by the pin 23 carried by the sleeve 21. In such construction, the pin may move longitudinally of the bar 18 under normal sway of the side walls of the vehicle, and the swaying or pitching of the vehicle will not affect the purpose and function of the retainer bars as hereinbefore described.

While I have illustrated and described the preferred form of construction for carrying my invention into effect, this is capable of variation and modification without departing from the spirit of the invention. I, therefore do not wish to be limited to the precise details of construction set forth, but desire to avail myself of such variations and modifications as come within the scope of the appended claims.

Having thus described my invention, what I claim as new and desire to protect by Letters Patent is:

1. An attaching head for a load supporting cross bar which has operative connection to a cross bar supporting member, said head having means for removably connecting said cross bar to said supporting member, said connecting means including a stationary upper jaw providing a horizontally extending unobstructed flush bearing surface engageable with and slidable on a portion of said supporting member, a lower jaw pivotally connected to said stationary jaw about an axis transversely with respect to the longitudinal axis of said cross bar, latch means carried by said lower jaw and adapted to engage and latch said head to the support member so as to prevent horizontal movement of said head relative thereto, said lower jaw when pivoted into a closed position with respect to the supporting member cooperates with said flush bearing surface of said upper jaw to prevent vertical movement of said head relative to said supporting member, and means carried by said stationary jaw and adapted to engage a portion of said lower jaw when it is pivoted into a closed position with respect to said upper jaw so as to latch said lower jaw in said closed position and to releasably latch the cross bar supporting member between said jaws.

2. An attaching head for a load supporting cross bar which has operative connection to a cross bar supporting member, said head having means for removably connecting said cross bar to said supporting member, said connecting means including a stationary upper jaw providing a horizontally extending unobstructed flush bearing surface engageable with and slidable on a portion of said supporting member, a lower jaw pivotally connected to said stationary jaw about an axis transversely with respect to the longitudinal axis of said cross bar, latch means carried by said lower jaw and adapted to engage and latch said head to the supporting member so as to prevent horizontal movement of said head relative thereto, said lower jaw when pivoted into a closed position with respect to the supporting member cooperates with said flush bearing surface of said upper jaw to prevent vertical movement of said head relative to said supporting member, a latch finger pivotally connected to said upper jaw and yieldably urged into engagement with a portion of said lower jaw when it is pivoted into a closed position with respect to said upper jaw so as to latch said lower jaw in said closed position and to releasably latch the cross bar supporting member between said jaws.

3. A supporting member for releasably connecting a load bearing bar to an apertured support comprising a head including a stationary jaw providing a horizontally extending unobstructed flush bearing surface engageable with and slidable on said apertured support, a lower jaw pivotally connected to said stationary jaw about an axis transversely with respect to the longitudinal axis of said load bearing bar, latch means carried by said lower jaw and adapted to engage and latch said head to said apertured support so as to prevent horizontal movement of said head relative thereto, said lower jaw when pivoted into a closed position with respect to the upper jaw cooperates with said flush bearing surface of said upper jaw to prevent vertical movement of said head relative to the apertured support, means pivotally carried by said stationary jaw and adapted to engage a portion of said lower jaw when it is pivoted into a closed position for latching said lower jaw in said closed position so as to releasably latch said apertured support between said jaws, means provided by said bar for telescopically connecting said head thereto, means provided by said bar for rotatably connecting said head thereto, and a latch member provided by said lower jaw and engageable with the means for rotatably connecting said head to said bar when said lower jaw is pivoted into its closed position for preventing rotation of said head relative to said bar and said apertured support.

4. The device as defined by claim 3 wherein said latch means comprises a plurality of locking pins insertable into preselected apertures formed in the apertured support.

References Cited in the file of this patent.

UNITED STATES PATENTS

| | | |
|---|---|---|
| Re. 24,118 | Fahland | Feb. 7, 1956 |
| 2,091,869 | McCurdy | Aug. 31, 1937 |
| 2,440,437 | Fahland | Apr. 27, 1948 |
| 2,467,681 | McKinney | Apr. 19, 1949 |
| 2,468,101 | Nampa | Apr. 26, 1949 |
| 2,514,229 | Fahland | July 4, 1950 |
| 2,519,846 | Nampa | Aug. 22, 1950 |
| 2,613,615 | Nampa | Oct. 4, 1952 |
| 2,679,214 | Nampa | May 25, 1954 |
| 2,725,826 | Tobin et al. | Dec. 6, 1955 |
| 2,806,436 | Johnston | Sept. 17, 1957 |